(No Model.)  5 Sheets—Sheet 1.

J. H. SWIFT.
BOX NAILING MACHINE.

No. 408,764.  Patented Aug. 13, 1889.

(No Model.) J. H. SWIFT. 5 Sheets—Sheet 2.
BOX NAILING MACHINE.

No. 408,764. Patented Aug. 13, 1889.

Witnesses:
Geo. W. Miatt
D. W. Gardner

Inventor:
Joseph H. Swift
by Paul H. Bate
his attorney.

(No Model.)  5 Sheets—Sheet 3.

J. H. SWIFT.
BOX NAILING MACHINE.

No. 408,764.  Patented Aug. 13, 1889.

(No Model.)  J. H. SWIFT.  5 Sheets—Sheet 4.
BOX NAILING MACHINE.

No. 408,764.  Patented Aug. 13, 1889.

(No Model.)  J. H. SWIFT.  5 Sheets—Sheet 5.
BOX NAILING MACHINE.

No. 408,764. Patented Aug. 13, 1889.

UNITED STATES PATENT OFFICE.

JOSEPH H. SWIFT, OF BROOKLYN, NEW YORK.

BOX-NAILING MACHINE.

SPECIFICATION forming part of Letters Patent No. 408,764, dated August 13, 1889.

Application filed July 1, 1887. Serial No. 243,106. (No model.)

*To all whom it may concern:*

Be it known that I, JOSEPH H. SWIFT, a citizen of the United States, residing at the city of Brooklyn, in the county of Kings and State of New York, have invented certain new and useful Improvements in Box-Nailing Machines, of which the following is a specification, reference being had to the accompanying drawings.
In the form of box-nailing machine heretofore patented to me under Letters Patent of the United States No. 289,941 motion was imparted to the machine by means of an independent engine operating through intermediate gearing.

My present invention consists in certain improvements in such form of machine, whereby motion is imparted thereto by means of certain mechanical contrivances supported upon the frame of the machine and hereinafter described.

Figure 1:
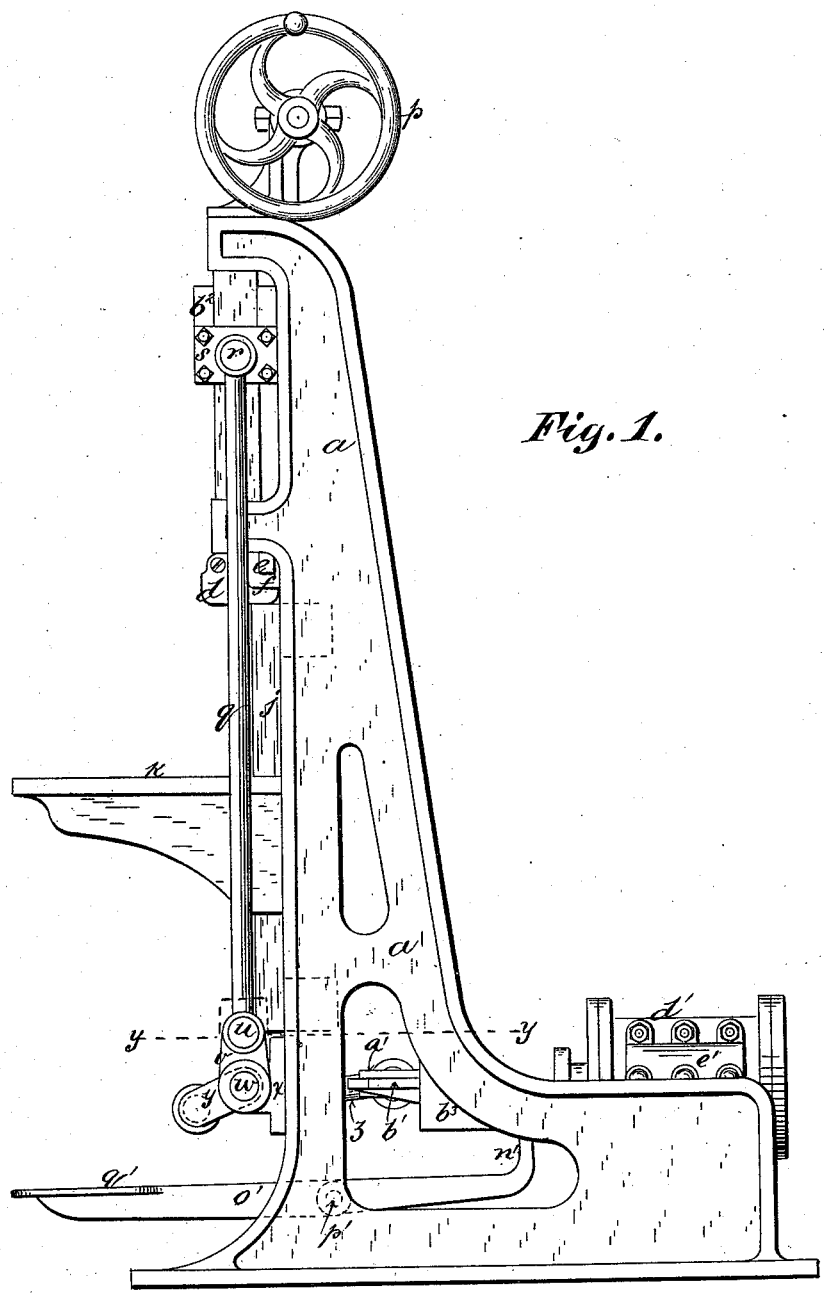
Figure 2:
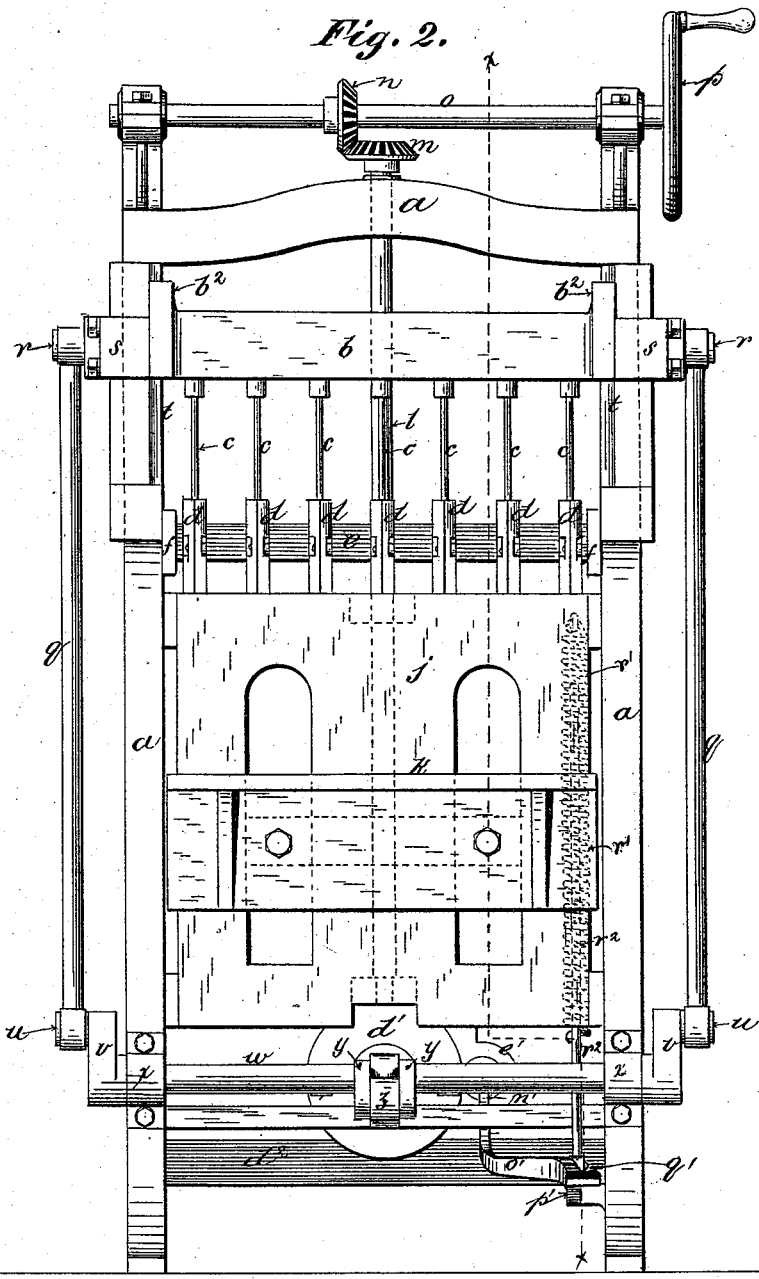
Figure 3:
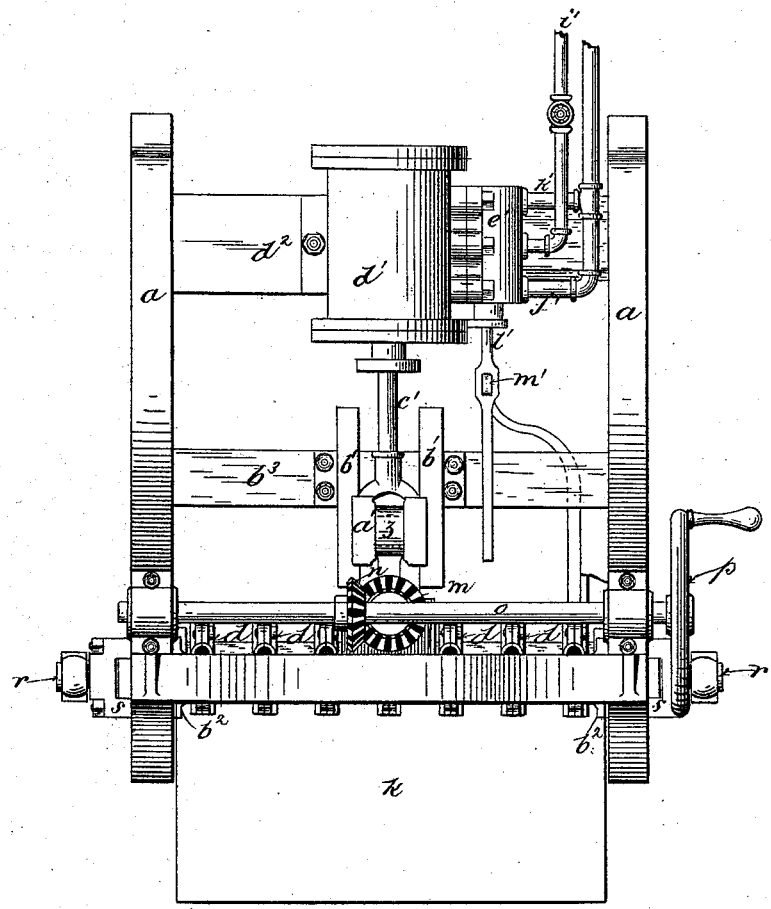
Figure 4:
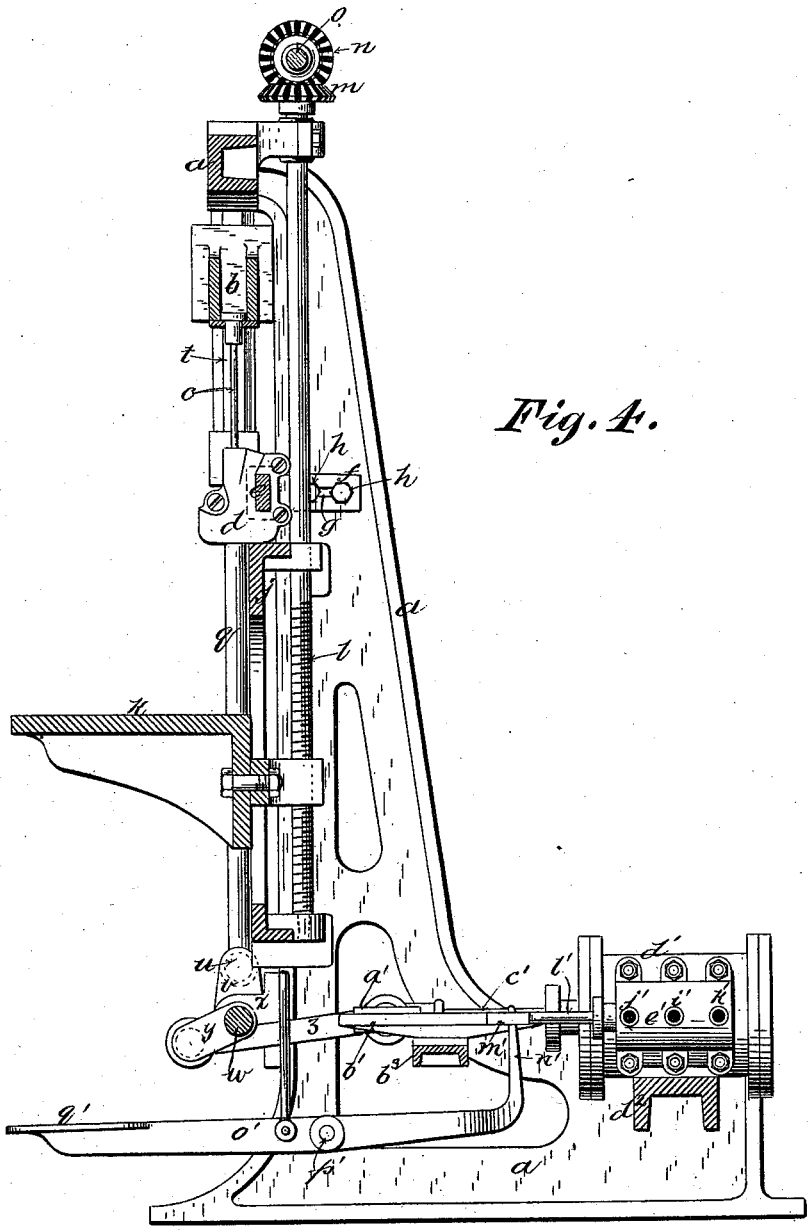
Figure 5:
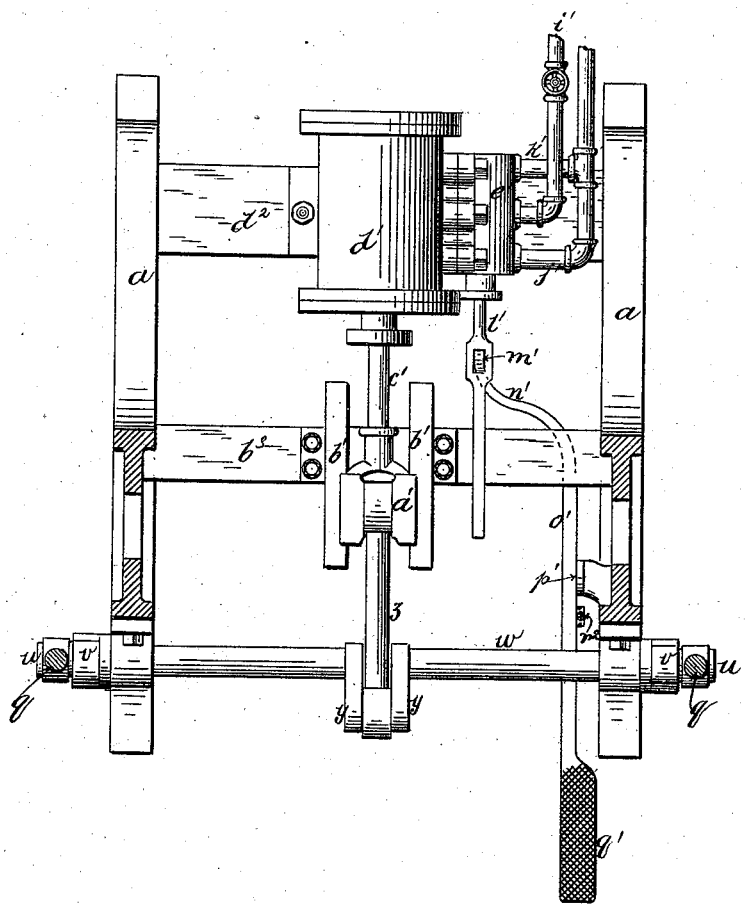

In the accompanying drawings, Figure 1 is intended to represent a side elevation of the machine; Fig. 2, a front elevation; Fig. 3, a top or plan view; Fig. 4, a sectional elevation on the plane of line $x\,x$ of Fig. 2; Fig. 5, a horizontal section on the plane of line $y\,y$ of Fig. 1.

Similar letters of reference are intended to refer to similar parts.

The required nail-feeder and nail-tubes are not shown in the drawings, there being several well-known forms of the same and several well-known ways of applying the same to box-nailing machines.

In the operation of my improved machine a suitable frame $a$ is provided, near the top of which is supported a reciprocating cross-head $b$, Figs. 1, 2, and 4. Such cross-head is provided with a set or series of nail-punches $c$, which co-operate with a set or series of nail-boxes $d$, supported on a bar $e$, substantially as shown in Figs. 2 and 4. The bar $e$ is held in position by the brackets $f$, Figs. 2 and 4, the inner ends of which are provided with slots $g$, through which pass the bolts $h$. The position of the bar $e$ may be adjusted horizontally by loosening the bolts $h$ and changing the position of the brackets $f$, as desired.
The machine is also provided with a back plate $j$ and adjustable table $k$, Figs. 1, 2, and 4. The table $k$ is arranged and operated (by means of the screw-shaft $l$, the beveled gears $m\,n$, the shaft $o$, and the hand-wheel $p$) substantially as shown and described in my prior patent, No. 289,941.

The cross-head $b$ is reciprocated vertically by means of the vertical connecting-rods $q$, which are connected at their upper ends with the ends of the cross-head $b$ by means of suitable wrist-pins $r$, substantially as shown in Figs. 1, 2, and 4.

The wrist-pins $r$ form part of metal castings $s$, which straddle the ways $t$ and are bolted to the ends of the cross-head $b$. The ends $b^2$ of the cross-head $b$ slide upon the ways $t$, with which the frame of the machine is provided, Figs. 1, 2, and 4.

The connecting-rods $q$ are suitably connected at their lower ends with the wrist-pins $u$, which form part of the crank-arms $v$, Fig. 2. The crank-arms $v$, which are attached to the crank-shaft $w$, are supported in bearings $x$. The shaft $w$ is formed with the crank $y$, within the two arms of which is pivoted one end of a pitman $z$, substantially as shown in Figs. 1, 4, and 5. The other end of the pitman is suitably pivoted on or to the cross-head $a'$, which slides on the ways $b'$, Fig. 5, and is properly secured to the piston-rod $c'$ of the steam-cylinder $d'$. The ways or slides $b'$ are supported in the usual manner on a cross-bar $b^3$, forming part of the frame of the machine. The cylinder $d'$, which is supported on the cross-bar $d^2$ of the machine-frame, is provided on its side with a valve-chamber $e'$ of the usual form, the latter having suitable supply and exhaust ports, to which the necessary steam supply and exhaust pipes $i'\,j'\,k'$ are to be respectively attached, Figs. 4 and 5. Steam is supplied to the valve-chamber $e'$ through the pipe $i'$, and thence to the cylinder $d'$ through suitable connecting-ports, the supply and exhaust being regulated in the usual way by means of a valve-motion controlled by the rod $l'$, Figs. 4 and 5. The valve-rod $l'$ is formed with a slot $m'$, within which is pivoted the upper end of the vertical arm $n'$ of the treadle $o'$. The treadle $o'$ is pivoted to the frame at the point marked $p'$, and is provided with a foot-piece $q'$. The treadle $o'$ is maintained in the position shown by means of the spiral spring $r'$, the upper end of which is secured to the rear side of the back plate $j$, and the lower end to the rod $r^2$, which latter is held within the coil of the spring $r'$, and is secured at its lower end to the treadle $o'$, Figs. 2 and 5.

The operation of my improved machine is as follows: The machine being at rest, as shown in the drawings, and the cross-head $b$ with its supported nail-punches being elevated, as shown, the box or box-frame to be nailed is placed in a suitable position on the table $k$. The operator then presses his foot on the foot-piece $q'$ of the treadle $o'$, thus admitting through the operation of the valve-rod $l'$ upon a suitable valve in the valve-chamber $e'$ the steam which is supplied through the pipe $i'$ to the valve-chamber $e$, and thence through a suitable port to the cylinder $d'$ in front of or above the piston-head. The piston-head will thus be forced back or to the right. As the piston-head is forced back the piston-rod $c'$ will draw after it the cross-head $a'$, to which latter is secured the pitman $z$, which will likewise be drawn back, and thereby cause a partial revolution of the crank-shaft $w$. As the crank-shaft $w$ is thus caused to partially revolve, the crank-arms $v$ will draw down the connecting-rod $q$, and thereby depress the cross-head $b$ and force its supported nail-punches through the channels of the nail-boxes, thus driving the nails supplied to the latter. As soon as the operator removes his foot from the treadle, the latter through the tension of the spring $r'$, operating through the rod $r^2$, will be forced back to the position shown in the drawings, thereby cutting off, through the action of the intermediate valve-rod $l'$ and the valve in the chamber $e'$, the supply of steam from the cylinder $d'$ in front of the piston-head, and admitting it instead back of the piston-head. Suitable provision being made in the usual way for the exhaust at the same time of the steam in front of the piston-head, the latter will be forced forward or to the left, and, operating upon the intermediate and connecting parts, will force the cross-head $b$ back to its original and elevated position. Provision is of course made in the usual way for the exhaust of the steam from behind the piston-head as required in the operation of the machine. This operation of the machine may of course be kept up indefinitely.

In the practice of my invention I do not limit myself to the exact form of machine shown, nor to the exact form of the special devices shown and described.

I desire in this present application to limit the invention to a machine in which the nail-driving mechanism, consisting of the reciprocating cross-head with its supported nail-punches, is operated through intermediate parts, and not directly by the piston-rod of the cylinder, as in the case of the machine described and claimed by me in another application for Letters Patent of the United States, Serial No. 243,107, filed July 1, 1887.

What I claim as my invention, and desire to secure by Letters Patent, is—

1. The combination, in a box-nailing machine, of a support for the box or box-frame to be nailed, a reciprocating cross-head provided with the necessary nail-punches, nail-boxes adapted to co-operate with the nail-punches, and mechanism for operating the cross-head, consisting of a cylinder $d'$, supported on the frame of the machine, the piston-rod $c'$ of which is connected with a crank-shaft arranged and adapted to operate the reciprocating cross-head, substantially as set forth.

2. The combination, within and upon the frame of the box-nailing machine, of a table for the support of the box or box-frame to be nailed, a vertically-reciprocating cross-head provided with the necessary nail-punches, nail-boxes adapted to co-operate with the nail-punches, and mechanism for operating the reciprocating cross-head, consisting of a steam-cylinder $d'$, provided with suitable connecting and operating parts, piston-rod $c'$, cross-head $a'$, ways $b'$, pitman $z$, crank $y$, crank-shaft $w$, crank-arms $v$, and connecting-rods $q$, which latter are connected with the crank-arms $v$ and with the reciprocating cross-head, substantially as set forth.

3. The combination, within and upon the frame of a box-nailing machine of the form herein set forth, of a table for the support of the box or box-frame to be nailed, a vertically-reciprocating cross-head provided with the necessary nail-punches, nail-boxes adapted to co-operate with the nail-punches, and mechanism consisting of a steam-cylinder $d'$, with suitable connecting parts, valve-rod $l'$, treadle $o'$, spring $r'$, suitably connected with the treadle and with the machine, piston-rod $c'$, cross-head $a'$, ways $b'$, pitman $z$, crank $y$, crank-shaft $w$, crank-arms $v$, connecting-rods $q$, wrist-pins $r$, and castings $s$, for operating the reciprocating cross-head $b$, substantially as described.

In testimony whereof I have signed my name to this specification in the presence of two subscribing witnesses.

JOSEPH H. SWIFT.

Witnesses:
WM. GARDNER,
WM. A. POLLOCK.